(12) United States Patent
Ohishi

(10) Patent No.: US 6,433,860 B1
(45) Date of Patent: Aug. 13, 2002

(54) LIGHT WAVE RANGEFINDER

(75) Inventor: Masahiro Ohishi, Tokyo (JP)

(73) Assignee: Kabushiki Kaisha Topcon (JP)

( * ) Notice: Subject to any disclaimer, the term of this patent is extended or adjusted under 35 U.S.C. 154(b) by 0 days.

(21) Appl. No.: 09/714,386

(22) Filed: Nov. 16, 2000

(30) Foreign Application Priority Data

Nov. 17, 1999 (JP) .......................................... 11-327524

(51) Int. Cl.⁷ ................................................. G01C 3/08
(52) U.S. Cl. .................................... 356/5.01; 356/4.01
(58) Field of Search ................................ 356/3.01–5.15

(56) References Cited

U.S. PATENT DOCUMENTS

| | | | | |
|---|---|---|---|---|
| 3,572,909 A | * | 3/1971 | Van Patten et al. ............. | 351/6 |
| 3,610,127 A | * | 10/1971 | Ruhle ............................. | 95/44 |
| 4,595,829 A | * | 6/1986 | Neumann et al. ............ | 250/201 |
| 4,784,450 A | * | 11/1988 | Jain et al. ................. | 350/96.15 |
| 4,825,091 A | * | 4/1989 | Breyer et al. ................ | 250/560 |
| 5,013,660 A | * | 5/1991 | Kasuya et al. .............. | 435/173 |
| 5,054,911 A | * | 10/1991 | Ohishi et al. .................. | 356/5 |
| 5,532,813 A | * | 7/1996 | Ohishi et al. .............. | 356/5.01 |
| 5,745,623 A | * | 4/1998 | Ohotomo et al. ............. | 385/88 |
| 5,767,976 A | * | 6/1998 | Ankerhold et al. ......... | 356/437 |
| 6,048,105 A | * | 4/2000 | Ohtomo et al. ............... | 385/88 |

* cited by examiner

Primary Examiner—Thomas H. Tarcza
Assistant Examiner—Brian Andrea
(74) Attorney, Agent, or Firm—Baker Botts LLP

(57) ABSTRACT

The present invention relates to a light wave rangefinder for measuring a distance to an object of measurement by means of light reflected from the object of measurement without using a prism, and particularly to provision of a light wave rangefinder that sends pointer light for visually recognizing a measuring area and position. A light wave rangefinder according to the present invention comprises a measuring light emitting device which emits measuring light rays; a light transmitting optical system which directs the measuring light rays at an object of measurement; a light receiving optical system which receives the measuring light rays reflected from the object of measurement; a light receiving device which receives the reflected measuring light rays and forms a light receiving signal; a control arithmetic unit which calculates a distance to the object of measurement on the basis of the light receiving signal; and a pointer light emitting device which introduces visible light into the light transmitting optical system.

8 Claims, 8 Drawing Sheets

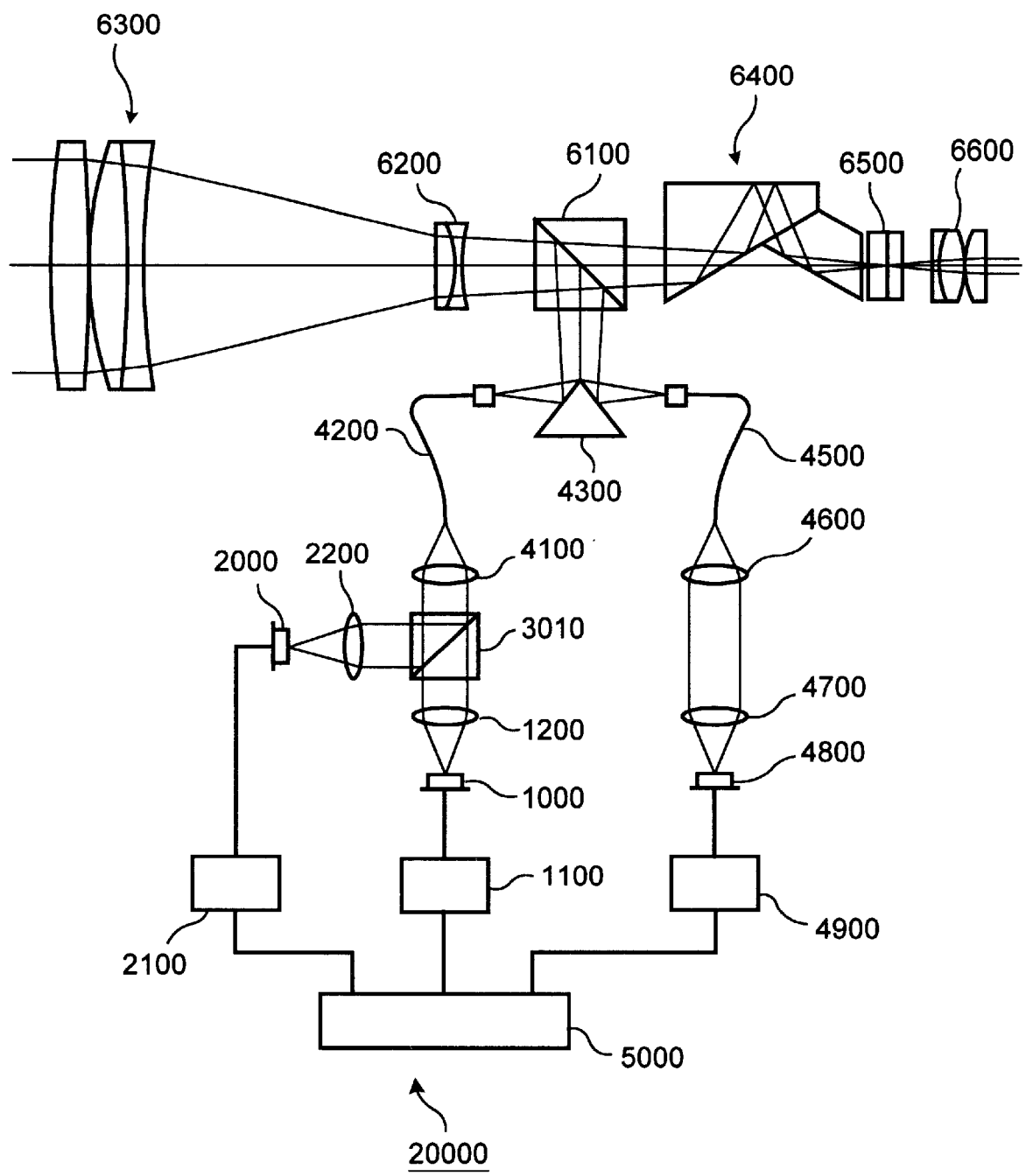
F I G. 3

(a)

(b)

LIGHT WAVE RANGEFINDER

BACKGROUND OF THE INVENTION

The present invention relates to a light wave rangefinder for measuring a distance to an object of measurement by means of light reflected from the object of measurement without using a prism, and particularly to a light wave rangefinder that sends pointer light for visually recognizing a measuring area and position.

Recently, a light wave rangefinder 9000 has been developed which allows measurement of a distance to an object without using a prism or the like (hereinafter referred to as non-prism measurement). Light wave rangefinders that enable this non-prism measurement conventionally make distance measurement by receiving weak light reflected from an object, or obtain a distance by emitting pulse light having a high peak power and then measuring the time between emitting and receiving light to and from an object of measurement.

As shown in FIG. 9, a conventional light wave rangefinder 9000 is provided with a separate laser pointer 9900. The light wave rangefinder 9000 comprises a light emitting device 9100, a light emitting device driving unit 9110, a condenser lens 9120, a condenser lens 9130, a fiber 9140 on the light emitting side, a mirror 9150, an object lens 9160, a fiber 9170 on the light receiving side, a condenser lens 9180, a condenser lens 9190, a light receiving device 9200, an amplifier 9210, and a control arithmetic unit 9300. The separate laser pointer 9900 comprises a pointer light emitting device 9910, a pointer light emitting device driving unit 9920, and a pointer condenser lens 9930. Since a light receiving plane and a light emitting plane have a finite size, light rays a emitted from the object lens 9160 slightly spread out, and also an area b of light rays to be received, or an area from which light can be received, slightly widens for the same reason as the emitted light rays a side.

An area of non-prism measurement is a portion c where the emitted light rays a and the light rays b to be received overlap each other. When a light source providing a wavelength in an invisible range is used as the measuring light source 9200, the user cannot perceive the position being measured. Therefore, a laser pointer 9900 as described above is added for use as an auxiliary function.

However, in the case of a light wave rangefinder provided with the conventional laser pointer, an area of measurement and an area irradiated with the laser pointer do not coincide with each other, and therefore this presents a problem in that it is not possible to correctly grasp an area of measurement. This is because an area of non-prism measurement widens, as described above, while light rays d of the laser pointer are outputted as substantially collimated light rays. This means that an area of measurement visually perceived by the user by means of the laser pointer and an area where actual distance measurement is made do not coincide with each other. More specifically, the user can identify an approximate measuring location irradiated with the laser pointer on an object of measurement, but does not perceive the location c that is irradiated with measuring light rays and therefore contributes to distance measurement.

This presents a problem especially when distance measurement is to be made on a portion smaller than the area c of non-prism measurement. Even when the user collimates the laser pointer so that only a desired measuring location is irradiated, an area wider than the desired location is measured as a result. This tends to mislead the user, and will also result in a false distance value.

In order to avoid this problem, the area c of measurement and the area d irradiated with the laser pointer need to coincide with each other. However, in order to achieve this, it is required that the widening of the area of measurement and the spreading out of the laser pointer light coincide with each other and be disposed on the same axis, and furthermore, the directions of irradiation need to coincide with each other. Therefore, this presents a problem in that the cost of the mechanism and the cost of adjustment are greatly increased.

Next, there is a problem of degradation of a signal-to-noise ratio caused by laser pointer light entering a light receiving system of a distance measuring apparatus. In a conventional example in which an area c of non-prism measurement and the light rays d of a laser pointer are disposed on the same axis, the light of the laser pointer is reflected from an object of measurement and then enters a light receiving system of a distance measuring apparatus. As a result, light other than measuring light enters a light receiving device, thereby increasing shot noise in the light receiving device and degrading its signal-to-noise ratio. There is also a problem in that if the output of the laser pointer is increased in order to enhance the visibility of the laser pointer, degradation of the signal-to-noise ratio becomes even more noticeable.

SUMMARY OF THE INVENTION

The present invention is intended to provide a light wave rangefinder that sends pointer light for visually recognizing a measuring area and position. According to the present invention, there are provided a measuring light emitting device which emits measuring light rays; a light transmitting optical system which directs the measuring light rays at an object of measurement; a light receiving optical system which receives the measuring light rays reflected from the object of measurement; a light receiving device which receives the reflected measuring light rays and forms a light receiving signal; a control arithmetic unit which calculates a distance to the object of measurement on the basis of the light receiving signal; and a pointer light emitting device which introduces visible light into the light transmitting optical system.

BRIEF DESCRIPTION OF THE DRAWINGS

Preferred embodiments of the present invention are illustrated in the drawings in which:

FIG. 3 is a diagram of assistance in explaining the configuration of a light wave rangefinder of a second embodiment;

DESCRIPTION OF THE INVENTION

Preferred embodiments of the present invention will be described with reference to the drawings.

First Embodiment

Figure 1:
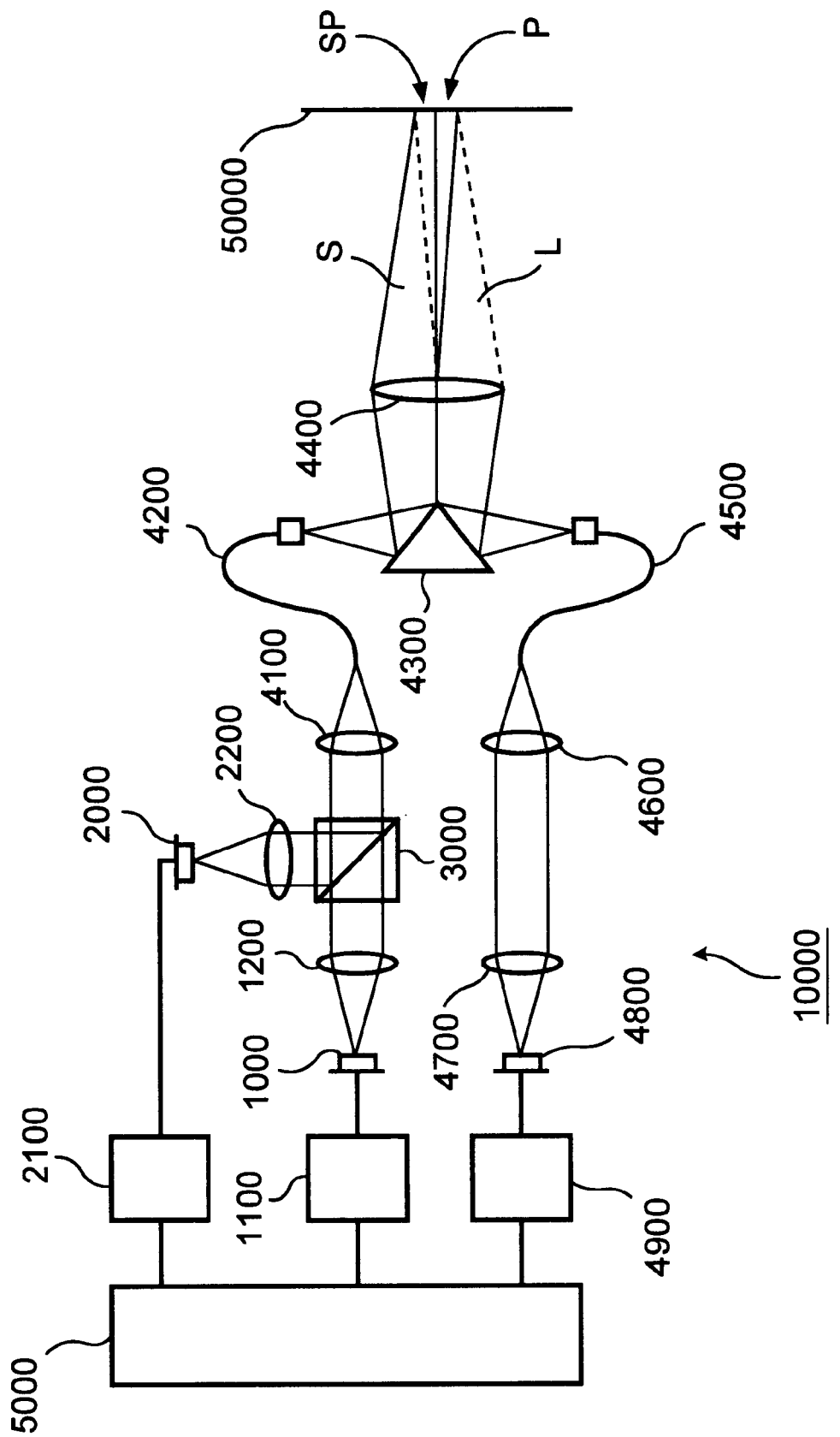
FIG. 1 is a diagram of assistance in explaining the configuration of a light wave rangefinder of a first embodiment of the present invention.

With reference to FIG. 1, a light wave rangefinder 10000 of a first embodiment of the present invention will be described.

The light wave rangefinder 10000 comprises a measuring light emitting device 1000, a measuring light emitting device driving unit 1100, a measuring condenser lens 1200, a pointer light emitting device 2000, a pointer light emitting device driving unit 2100, a pointer condenser lens 2200, a prism 3000, a first condenser lens 4100, a fiber 4200 on the light emitting side, a mirror 4300, an object lens 4400, a fiber 4500 on the light receiving side, a second condenser lens 4600, a third condenser lens 4700, a light receiving device 4800, an amplifier 4900, and a control arithmetic unit 5000. It should be noted that the fiber 4200 on the light emitting side corresponds to a light guide member on the light emitting side, and the fiber 4500 on the light receiving side corresponds to a light guide member on the light receiving side.

The measuring light emitting device 1000 is a pulse laser diode having a relatively high peak power and capable of generating a pulse wave with a duty ratio of about 0.01%.

The pointer light emitting device 2000 is a semiconductor laser for emitting visible light.

The reflection plane of the prism 3000 is, for example, a polarizing reflection plane. The polarizing reflection plane is formed in such a manner as to adjust the polarization direction of rays of linearly polarized light from the pointer light emitting device 2000 so that the rays are reflected as S-polarized light with respect to the reflection plane. Also, the polarizing reflection plane is formed in such a manner as to transmit P-polarized light.

It should be noted that the measuring condenser lens 1200, the prism 3000, the first condenser lens 4100, the fiber 4200 on the light emitting side, the mirror 4300, and the object lens 4400 correspond to a light transmitting optical system. Also, the object lens 4400, the mirror 4300, the fiber 4500 on the light receiving side, the second condenser lens 4600, and the third condenser lens 4700 correspond to a light receiving optical system.

The control arithmetic unit 5000 calculates a distance to an object of measurement 50000 on the basis of the pulse of the light received by the light receiving device 4800, and also controls the whole of the light wave rangefinder 10000.

The control arithmetic unit 5000 sends a light emission control signal to the measuring light emitting device driving unit 1100, whereby the measuring light emitting device driving unit 1100 drives the measuring light emitting device 1000 so as to emit light. The measuring light rays S of an emitted light pulse are collimated by the measuring condenser lens 1200, then pass through the prism 3000, and enter the first condenser lens 4100.

The measuring light rays S that have entered the first condenser lens 4100 are sent to the mirror 4300 via the fiber 4200 on the light emitting side. After reflected from the mirror 4300, the measuring light rays S are emitted through the object lens 4400 to the object of measurement 50000. The measuring light rays S that have been emitted to the object of measurement 50000 form a spot SP on the object of measurement 50000.

Measuring light rays L reflected from the object of measurement 50000 in a diffused manner are sent to the mirror 4300 through the object lens 4400. After reflected from the mirror 4300, the reflected measuring light rays L are sent to the second condenser lens 4600 via the fiber 4500 on the light receiving side. The reflected measuring light rays L, having been collimated by the second condenser lens 4600, enter the third condenser lens 4700, and are condensed on the light receiving device 4800 by the third condenser lens 4700.

The light receiving device 4800 converts the reflected measuring light rays L into a light receiving pulse signal. The signal is amplified by the amplifier 4900 and then inputted to the control arithmetic unit 5000. The control arithmetic unit 5000 may calculate a distance to the object of measurement 50000 on the basis of the light receiving pulse signal.

In addition, the control arithmetic unit 5000 outputs a light emission timing signal to the pointer light emitting device driving unit 2100, whereby the pointer light emitting device driving unit 2100 drives the pointer light emitting device 2000 so as to emit visible light. The visible laser light outputted from the pointer light emitting device 2000 is collimated by the pointer condenser lens 2200, made to enter the prism 3000 to be deflected, and then sent to the fiber 4200 on the light emitting side via the first condenser lens 4100. Then, together with the measuring light rays, the visible pointer light is reflected from the mirror 4300, and thereafter emitted through the object lens 4400 to the object of measurement 50000. As a result, it is possible to form a laser pointer image P on the object of measurement 50000. Specifically, the light wave rangefinder according to the first embodiment is configured in such a way that visible light from the pointer light emitting device 2000 is introduced into the entrance end of the fiber 4200 on the light emitting side. In the first embodiment, the light wave rangefinder is configured in such a way that visible laser light outputted from the pointer light emitting device 2000 is sent to the fiber 4200 on the light emitting side; however, it is possible to configure the light wave rangefinder in such a manner that the visible laser light is emitted from the fiber 4500 on the light receiving side.

Incidentally, the laser pointer image P can be focused on the object of measurement 50000 by moving the object lens 4400 along the optical axis by means of an appropriate moving mechanism (pointer focusing mechanism).

The output end of the fiber 4200 on the light emitting side and the input end of the fiber 4500 on the light receiving side are disposed in conjugate positions with respect to the object lens 4400. Moreover, the object lens 4400 can be moved in a finely controlled manner along the optical axis by an appropriate moving function. Therefore, when the laser pointer image P is focused on the object of measurement 50000 by moving the object lens 4400 in a finely controlled manner, the measuring light rays S are focused on the object of measurement 50000 at the same time.

In addition, an image at the entrance end of the fiber 4500 on the light receiving side is also focused on the object of measurement 50000. Thus, the three areas of the light rays perfectly coincide with one another.

Thus, the area visually perceived by means of the laser pointer image P coincides with the area of measurement (spot SP). It is therefore possible to obtain a superior effect in that the user can visually identify an area of measurement.

Figure 2:
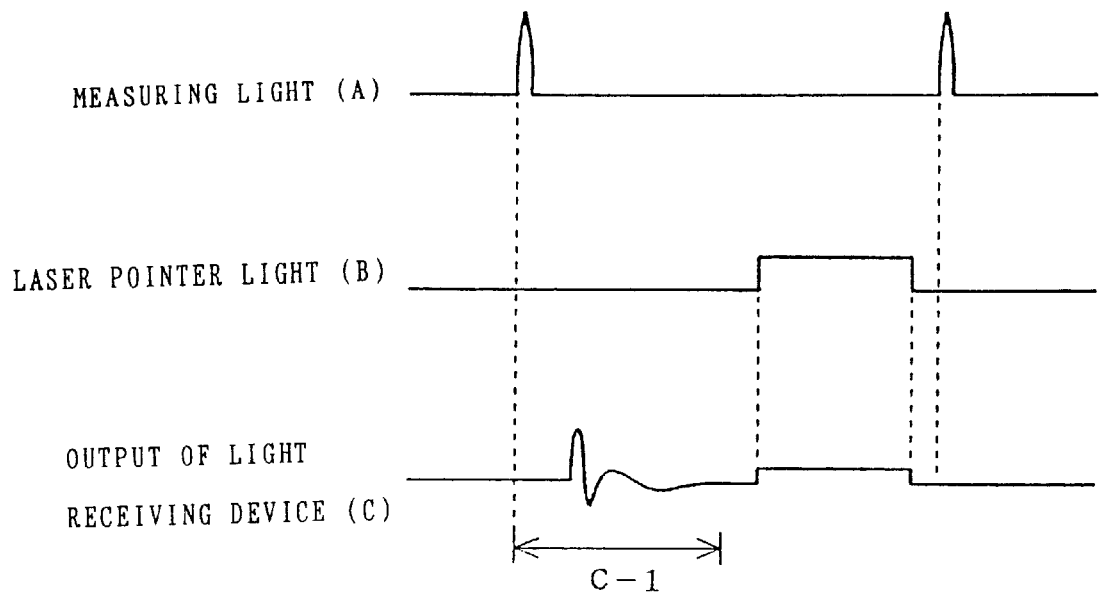
FIGS. 2(A), (B), and (C) are diagrams of assistance in explaining light emission timing of measuring light rays S and laser pointer light.

FIGS. 2(A), 2(B), and 2(C) are diagrams of assistance in explaining light emission timing of measuring light rays S and laser pointer light. Light having a pulse shape as shown in FIG. 2(A) is emitted from the measuring light emitting device 1000. The pulse width of the emitted light is a few nsec, and the repetition period of the light pulse is a few hundred μsec, which is determined by characteristics of the light source.

The measuring light rays L reflected from the object of measurement 50000 in a diffused manner are converted into an electric signal by the light receiving device 4800. A signal resulting from this conversion is shown as a portion of (c−1) in FIG. 2(C).

Distances measurable by a non-prism method are roughly in a range of a few hundred meters, although they depend on the output power of the light emitting device, the reflectance of the object of measurement 50000, or the like. The portion of (c−1) is in a range of a few μsec from light emission.

The emission of laser pointer light is performed in such a manner as to avoid the time range of (c−1), as shown in FIG. 2(B). Thus, as shown in FIG. 2(C), the reflected measuring light rays L and the laser pointer light are temporally separated from each other on the light receiving device 4800. This makes it possible to temporally separate shot noise occurring in the light receiving device 4800 due to the laser pointer light from a light receiving signal generated from the reflected measuring light rays L. Therefore, it is possible to emit laser pointer light without degrading the S/N ratio of a light receiving signal.

Second Embodiment

A light wave rangefinder 20000 of a second embodiment of the present invention will be described with reference to FIG. 3. The light wave rangefinder 20000 according to the second embodiment is a combination of the light wave rangefinder 10000 according to the first embodiment and a collimating optical system 6000.

The light wave rangefinder 20000 according to the second embodiment comprises a measuring light emitting device 1000, a measuring light emitting device driving unit 1100, a measuring condenser lens 1200, a pointer light emitting device 2000, a pointer light emitting device driving unit 2100, a pointer condenser lens 2200, a polarization beam splitter 3010, a first condenser lens 4100, a fiber 4200 on the light emitting side, a mirror 4300, a dichroic mirror 6100, a focusing lens 6200, an object lens group 6300, an erecting prism 6400, a focal plane plate 6500, an eyepiece 6600, a fiber 4500 on the light receiving side, a second condenser lens 4600, a third condenser lens 4700, a light receiving device 4800, an amplifier 4900, and a control arithmetic unit 5000.

The dichroic mirror 6100, the focusing lens 6200, the object lens group 6300, the erecting prism 6400, the focal plane plate 6500, and the eyepiece 6600 correspond to the collimating optical system 6000. The focusing lens 6200 is provided to form an image at a collimation point onto the focal plane plate 6500 by moving the focusing lens along the optical axis.

It should be noted that the measuring condenser lens 1200, the polarization beam splitter 3010, the first condenser lens 4100, the fiber 4200 on the light emitting side, the mirror 4300, the dichroic mirror 6100, the focusing lens 6200, and the object lens group 6300 correspond to a light transmitting optical system. Also, the object lens group 6300, the focusing lens 6200, the dichroic mirror 6100, the mirror 4300, the fiber 4500 on the light receiving side, the second condenser lens 4600, and the third condenser lens 4700 correspond to a light receiving optical system.

The control arithmetic unit 5000 sends a light emission control signal to the measuring light emitting device driving unit 1100, whereby the measuring light emitting device driving unit 1100 drives the measuring light emitting device 1000 so as to emit light. The measuring light rays S of an emitted light pulse are collimated by the measuring condenser lens 1200, then pass through the polarization beam splitter 3010, and enter the first condenser lens 4100.

The measuring light rays S that have entered the first condenser lens 4100 are sent to the mirror 4300 via the fiber 4200 on the light emitting side. After reflected from the mirror 4300, the measuring light rays S enter the dichroic mirror 6100. The measuring light rays S that have been reflected from the dichroic mirror 6100 are emitted through the focusing lens 6200 and the object lens group 6300 to an object of measurement 50000.

Measuring light rays L reflected from the object of measurement 50000 in a diffused manner are sent to the dichroic mirror 6100 through the object lens group 6300 and the focusing lens 6200. After reflected from the dichroic mirror 6100, the reflected measuring light rays L enter the mirror 4300. The reflected measuring light rays L reflected from the mirror 4300 are sent to the second condenser lens 4600 via the fiber 4500 on the light receiving side. The reflected measuring light rays L, having been collimated by the second condenser lens 4600, enter the third condenser lens 4700, and are condensed on the light receiving device 4800 by the third condenser lens 4700.

In addition, the control arithmetic unit 5000 outputs a light emission timing signal to the pointer light emitting device driving unit 2100, whereby the pointer light emitting device driving unit 2100 drives the pointer light emitting device 2000 so as to emit linearly polarized visible light. The visible laser light outputted from the pointer light emitting device 2000 is collimated by the pointer condenser lens 2200, made to enter the polarization beam splitter 3010 to be deflected, and then sent to the fiber 4200 on the light emitting side via the first condenser lens 4100.

Then, together with the measuring light rays S, the visible pointer light is reflected from the mirror 4300, and thereafter enters the dichroic mirror 6100. The visible pointer light reflected from the dichroic mirror 6100 is emitted through the focusing lens 6200 and the object lens group 6300 to the object of measurement 50000. As a result, it is possible to form a laser pointer image P on the object of measurement 50000.

The erecting prism 6400, the focal plane plate 6500, and the eyepiece 6600 in the collimating optical system 6000 are configured on the same axis as that of the measuring optical system by means of the dichroic mirror 6100. The collimating optical system 6000 is provided to collimate a measuring point of the object of measurement 50000.

The focusing lens 6200 is configured in such a manner that it can be moved along the optical axis by means of an appropriate moving mechanism. It is possible to adjust the focus of the collimating optical system 6000 and the measuring optical system at the same time by moving the focusing lens 6200.

In normal survey of existing conditions and the like, such configuration allows collimation and focusing to be performed by a telescope of the collimating optical system 6000. In measurement in a dark place such as measurement of a wall surface in a tunnel, however, it is extremely difficult to attain focusing on the object of measurement 50000 by means of a collimating telescope. Moreover, in measurement of a section of a tunnel and the like, even if the inside of the tunnel is brightly illuminated, collimating work in measuring an area around the vertex of the tunnel forces the measurer to assume a posture that involves strain. Furthermore, in collimation of an extensive wall surface or a large rock at short range, the magnification of the telescope is too high, and therefore it is extremely difficult to grasp a current measuring position with respect to the whole of an object to be measured.

Even in such cases, the three areas of the light rays, that is, an area irradiated with laser pointer light, an area irradiated with measuring light rays S, and an image at the entrance end of the fiber 4500 on the light receiving side can be made to perfectly coincide with one another by bringing the laser pointer light into a focused state while visually checking the measuring position.

Even in measurement of an object of measurement 50000 at short range, it is much easier to exactly grasp a current measuring position with respect to the whole of an object to be measured. In addition, it is easier to perform focusing operation even in a dark environment. Furthermore, even when measurement is made inside a tunnel, it is much easier to measure an area around the vertex of the tunnel. Thus, the light wave rangefinder according to the second embodiment provides such superior effects.

Other configurations, actions, and the like of the light wave rangefinder 20000 of the second embodiment of the present invention are the same as those of the light wave rangefinder 10000 of the first embodiment, and therefore their description will be omitted.

Figure 4:
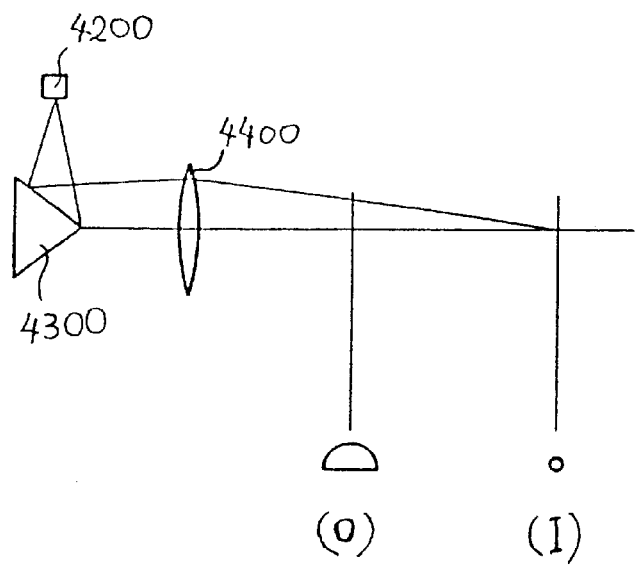
FIG. 4 is a diagram of assistance in explaining a modification of the second embodiment.

Next, FIG. 4 shows an example in which the aperture form of laser pointer light emitted from the object lens 4400 is made to be different from a circular form at the output end of the fiber 4200 on the light emitting side.

In this case, when focus is attained, an irradiation form of the laser pointer light becomes circular, and therefore it is possible to obtain an effect in that a state of focus can be confirmed. If the form of the laser pointer light is made to be the same as the circular form at the output end of the fiber 4200 on the light emitting side, a resulting form remains circular regardless of whether focus is attained or not, thus making it difficult to confirm a state of focus.

Specifically, as is clear from FIG. 4, in the case of a state of focus I, a fiber image is obtained and therefore a circular form appears. In the case of a state of non-focus O, a semicircle, which is an object lens aperture form, appears.

Incidentally, a light source for the pointer is not limited to a semiconductor laser, and the same effect can be obtained when a different light source such as a gas laser is used.

Principles of Pulse-system Light Wave Rangefinder

The principles of a light wave rangefinder using pulse light according to the present invention will be described with reference to FIGS. 5 and 6.

Figure 6:
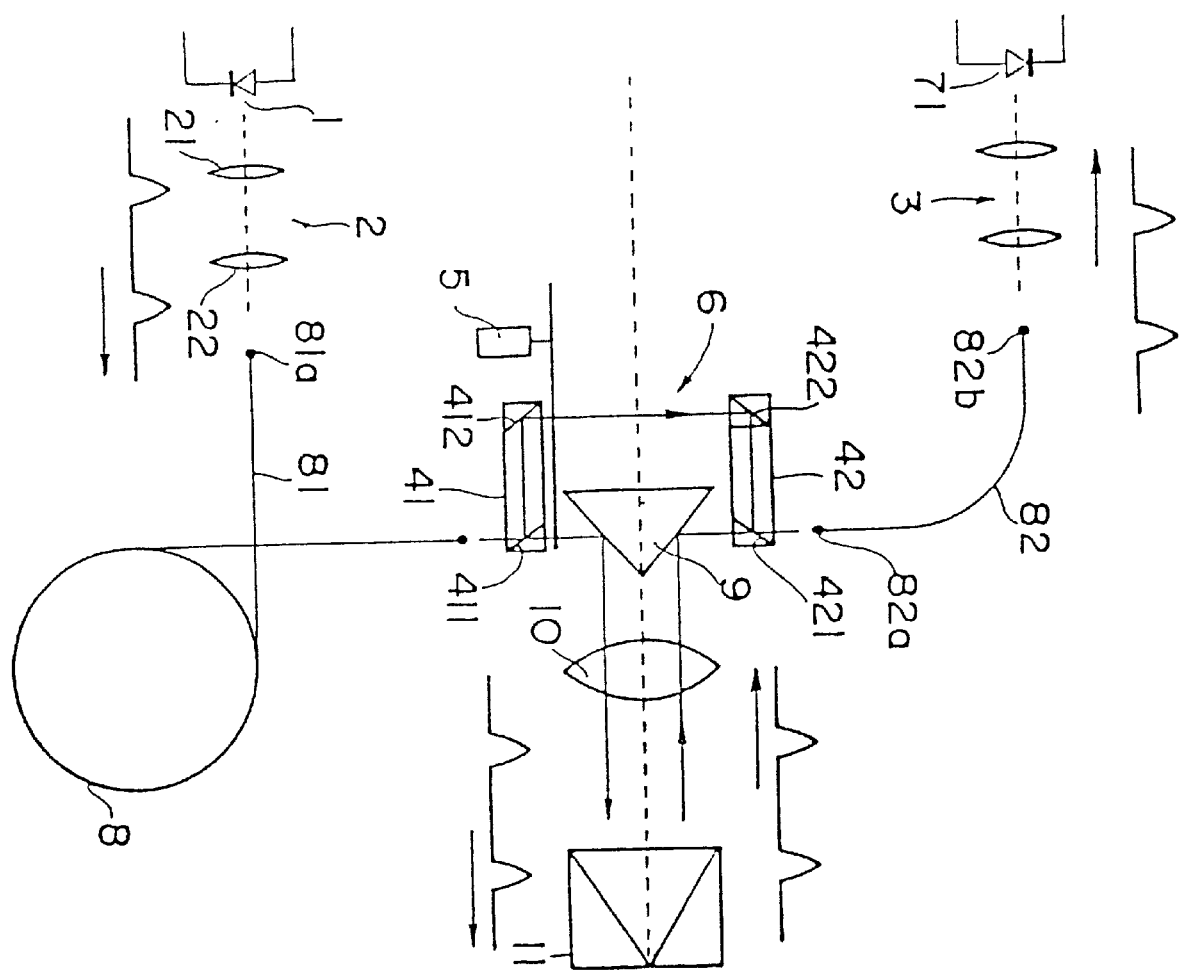
FIG. 6 is a diagram of assistance in explaining the principles of a pulse-system light wave rangefinder.

As shown in FIG. 6, the light wave rangefinder according to the present embodiment comprises a laser diode 1, a condenser lens 2, a condenser lens 3, a pair of split prisms 41 and 42, an optical path switching chopper 5, an internal optical path 6, an APD 71, a delaying optical fiber 8, a prism 9, and an object lens 10. Then, a corner cube 11 corresponds to an object of measurement disposed at a distance from the light wave rangefinder proper, and has a function of reflecting light pulse.

The laser diode 1, condenser lenses 21 and 22, a fiber 81 on the light emitting side, the split prism 41, the prism 9, and the object lens 10 correspond to an optical means.

The laser diode 1 corresponds to a light source. As the laser diode 1 of the present embodiment, a pulse laser diode is used which has a relatively high peak power and is capable of generating a pulse wave with a duty ratio of about 0.01%. The optical path switching chopper 5 is provided to switch light rays. A light receiving device 7 corresponds to a light receiving means, and it suffices if the light receiving device 7 is capable of receiving a pulse light beam emitted from the laser diode 1.

The delaying optical fiber 8 is an optical delaying means, and it is desirable to use a GI fiber as the delaying optical fiber 8 in order to prevent modal dispersion.

The split prism 41 comprises a first half mirror 411 and a second half mirror 412. The split prism 42 comprises a first half mirror 421 and a second half mirror 422. A connection between the laser diode 1 side and the split prism 41 is made by an optical fiber 81 on the light emitting side and the delaying optical fiber 8. Also, a connection between the split prism 42 and the light receiving device 7 side is made by an optical fiber 82 on the light receiving side. Incidentally, the present embodiment is configured in such a way that part of the optical fiber 81 on the light emitting side also serves as the delaying optical fiber 8.

When a light emitting pulse is sent from the laser diode 1, the condenser lenses 21 and 22 transmit it to the input end 81a of the optical fiber 81 on the light emitting side. Since the optical fiber 81 on the light emitting side is coupled to the delaying optical fiber 8, the light pulse travels through the delaying optical fiber 8 to the split prism 41. The pulse train that has passed through the first half mirror 411 of the split prism 41 can be emitted into an external distance-measuring optical path via the optical path switching chopper 5. The pulse that has been reflected from the first half mirror 411 of the split prism 41 and then reflected from the second half mirror 412 can be emitted into an internal distance-measuring optical path 6 via the optical path switching chopper 5. The optical path switching chopper 5 is provided to perform switching between the internal distance-measuring optical path 6 and the external distance-measuring optical path. Therefore, when the optical path switching chopper 5 selects the external distance-measuring optical path, the light pulse is reflected by the prism 9 and then emitted to the outside via the object lens 10.

The pulse emitted from the object lens 10 is reflected from the corner cube 11, received again by the object lens 10, and then sent to the prism 9. The received pulse train is reflected from the prism 9 and sent to the split prism 42. Having passed through the first half mirror 421 of the split prism 42, the pulse light to be received is sent to the light receiving end 82a of the optical fiber 82 on the light receiving side.

When the optical path switching chopper 5 selects the internal distance-measuring optical path 6, the light emitting pulse is sent to the split prism 42 via the internal distance-measuring optical path 6. Then, the light pulse is reflected by the first half mirror 421 and the second half mirror 422 incorporated in the split prism 42 and is thereafter sent to the light receiving end 82a of the optical fiber 82 on the light receiving side.

Then, the light pulse emitted from the emitting end 82b of the optical fiber 82 on the light receiving side is sent to the APD 71 via condenser lenses 31 and 32. The light pulse is thereafter converted into an electric current pulse by the light receiving device 7.

Next, the configuration of an electric circuit according to the present embodiment will be described in detail.

Figure 5:
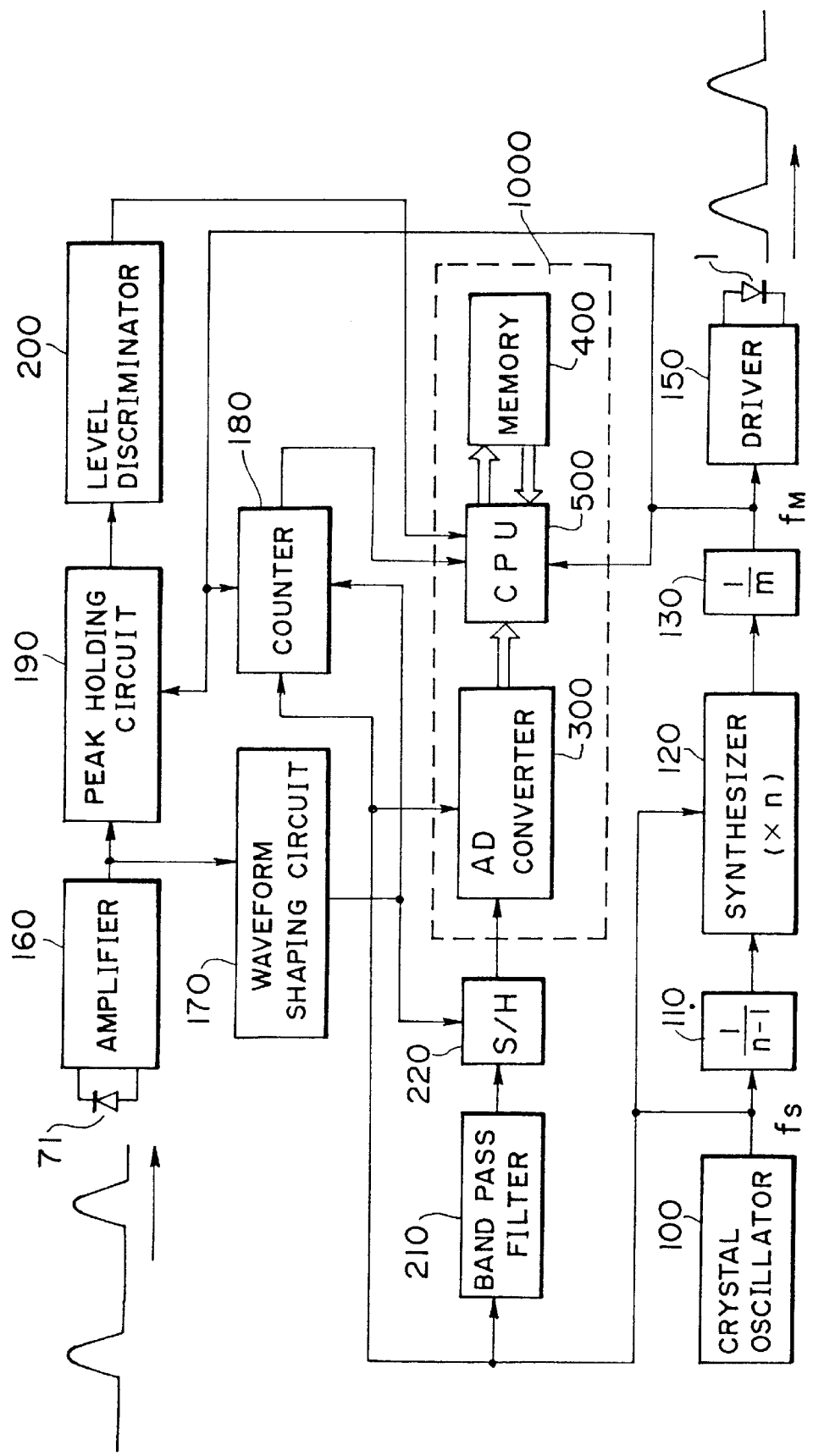
FIG. 5 is a diagram of assistance in explaining the principles of a pulse-system light wave rangefinder.

A first embodiment shown in FIG. 5 comprises a crystal oscillator 100, a first frequency divider 110, synthesizer 120, a second frequency divider 130, a laser diode 1, a laser diode driver 150, an APD 71, an amplifier 160, a waveform shaping circuit 170, a counter 180, a peak hold circuit 190, a level determination circuit 200, a band-pass filter 210, a sample and hold circuit (S/H) 220, and a phase measuring apparatus 90000. The phase measuring apparatus 90000 comprises an AD converter 300, a memory 400, and a CPU 500.

The crystal oscillator 100 is a reference signal generating means, and generates a reference signal $f_S$. This reference signal is supplied to the first frequency divider 110, the synthesizer 120, the band-pass filter 210, and the counter 180. The frequency of the reference signal supplied to the first frequency divider 110 is divided into 1/(n−1) by the first frequency divider 110, and the result is supplied to the synthesizer 120. The synthesizer 120 multiplies the signal supplied from the first frequency divider 110 by a factor of n, and sends the result to the second frequency divider 130. The second frequency divider 130 divides the frequency of the signal supplied from the synthesizer 120 into 1/m, thereby generating a measuring signal $f_M$. Incidentally, the output signals of the first frequency divider 110, the second frequency divider 130, and the synthesizer 120 are two-valued signals.

In addition, the laser diode driver 150 drives the laser diode 1 in a pulsing manner according to the measuring signal $f_M$ outputted by the second frequency divider 130.

The measuring signal $f_M$ outputted by the second frequency divider 130 is also supplied to the CPU 500, the counter 180, and the peak hold circuit 190. The measuring signal $f_M$ serves as a light emission confirming signal for the CPU 500, and serves as a reset signal for the counter 180 and the peak hold circuit 190.

The light pulse emitted from the laser diode 1 passes through an optical system, and is then received by the APD 71. The APD 71 is a light receiving device 7, and is a diode in which avalanche multiplication is induced by applying a deep bias to the p-n junction, so that a gain can be obtained. The APD 71 receives a light pulse that has passed through an internal reference optical path as well as a light pulse that has passed through an external distance-measuring optical path. The light pulses are converted by the APD 71 into electric signals in the form of an electric current pulse train, and then sent to the amplifier 160.

The amplifier 160 is provided to amplify a signal inputted from the APD 71. The output signal of the amplifier 160 is converted by the waveform shaping circuit 170 into two-valued digital data, and then sent to the counter 180, the sample and hold circuit (S/H) 220, and the AD converter 300.

The signal $f_S$ sent from the crystal oscillator 100 to the band-pass filter 210 is made into a sine wave, and then sent to the sample and hold circuit 220. The sample and hold circuit 220 samples and holds the sine wave using a signal from the waveform shaping circuit 170. Then, a value held by the sample and hold circuit 220 is sent to the AD converter 300 to be subjected to AD conversion, and then converted digital data is stored in the memory 400, which is specified in advance.

The peak of a signal sent from the amplifier 160 to the peak hold circuit 190 is held by the peak hold circuit 190 to generate a DC level signal corresponding to the peak value of pulse light. The DC level signal is then supplied to the level determination circuit 200. After receiving the signal from the peak hold circuit 190, the level determination circuit 200 determines whether or not the light quantity of the pulse train of received light is in a range where the APD 71 and the amplifier 160 operate properly, and sends the result to the CPU 500. The CPU 500 receives a signal from the level determination circuit 200, and utilizes data from the AD converter 300 only when the light quantity of the pulse train of the received light is at a proper value.

Next, phase relation when setting $f_S$=15 MHz, n=101, and m=5000 will be described.

When the values of m', $f_M$, and $f_L$ as well as their phase relation are to be determined for (n−1), the following equation is first used.

$$m = m'n + 1 \qquad \text{[Equation 2]}$$

Then, the value obtained is $$m' = \frac{m-1}{n} \qquad \text{[Equation 5]}$$
$$= \frac{5000-1}{101}$$
$$= 49\frac{50}{101}$$

In addition, the frequency $f_M$ of a pulse train is determined by $$f_M = \frac{n}{m(n \pm 1)} f_S \qquad \text{[Equation 1]}$$

Thus, the value obtained is $$f_M = \frac{n}{m(n-1)} f_S \qquad \text{[Equation 6]}$$
$$= \frac{101}{5000(101-1)} 15\ MH_z$$
$$= 3030\ H_z$$

In this case, the phase relation between the frequency $f_M$ of the received pulse train and the frequency $f_S$ of a sine wave supplied from the band-pass filter 210 is determined by $$\frac{\frac{1}{f_M}}{\frac{1}{f_S}} = \frac{m(n \pm 1)}{n} \qquad \text{[Equation 3]}$$
$$= \frac{(m'n+1) \times (n \pm 1)}{n}$$
$$= \frac{m'n^2 + n \pm m'n \pm 1}{n}$$
$$= m'n + 1 \pm m' \pm \frac{1}{n}$$

Then, the obtained value is $$m'n + 1 - m' - \frac{1}{n} = 49\frac{50}{101} \times 101 + 1 - \qquad \text{[Equation 7]}$$
$$49\frac{50}{101} - \frac{1}{101}$$
$$= 4951 - \frac{51}{101}$$

The phase relation is changed by the value of the equation 7 at each light emitting pulse, and the same phase relation appears again at a 101st light emitting pulse. This frequency is determined by $$f_L = \frac{f_M}{n} = \frac{1}{m(n \pm 1)} f_S \qquad \text{[Equation 4]}$$

Thus, the obtained value is $$f_L = \frac{f_M}{n} = \frac{1}{m(n-1)}f_S \qquad \text{[Equation 8]}$$
$$= \frac{3030 \, H_z}{101}$$
$$= 30 \, H_z$$

Specifically, a sine wave obtained by passing the frequency of 15 MHz sent from the crystal oscillator 100 through the band-pass filter 210 and the light emitting frequency 3030 Hz of the laser diode 1 gradually become out of phase. Therefore, similarly, a receiving timing signal and the sine wave obtained by passing the signal of 15 MHz through the band-pass filter 210 gradually become out of phase.

The phase relation between each light emitting pulse train and the sine wave signal obtained by passing the signal of 15 MHz through the band-pass filter 210 completes one period at a $101^{st}$ pulse. The phase relation of a light emitting pulse train at a $102^{nd}$ pulse is the same as that at a first pulse. Thus, the output signal of the sample and hold circuit (S/H) 220 completes one period at:

$$f = 3030 \, \text{Hz}/101$$
$$= 30 \, \text{Hz}$$

Figure 7:
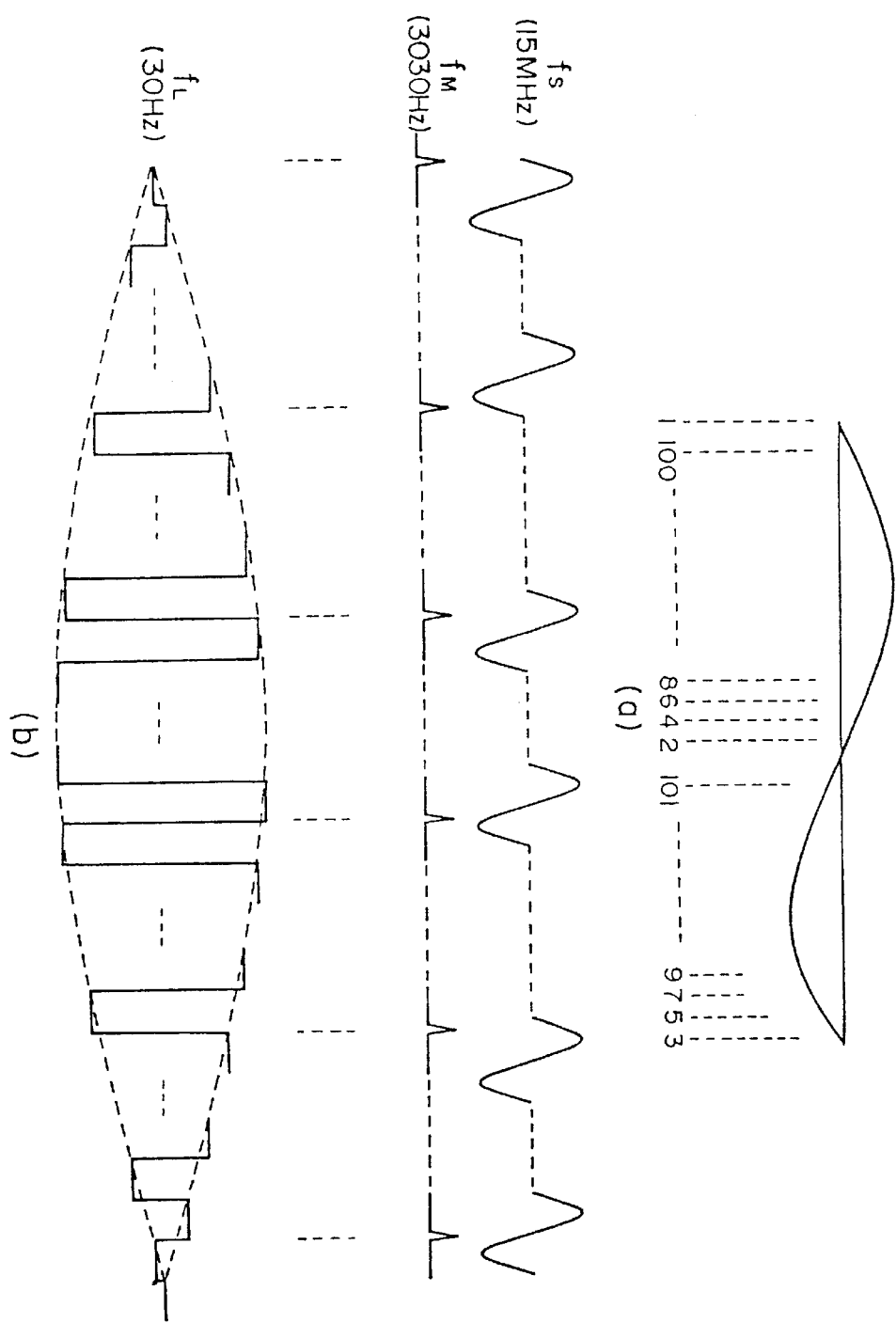
FIGS. 7(*a*) and 7(*b*) are diagrams of assistance in explaining the principles of a pulse-system light wave rangefinder.

This will be explained in detail with reference to FIGS. 7(a) and 7(b). FIG. 7(a) shows the sequence of a phase shift of a pulse train having a frequency $f_M$ relative to the frequency $f_S$ of a sine wave signal from the band-pass filter 210. FIG. 7(b) shows a relation between the frequency $f_S$ of a sine wave signal from the band-pass filter 210 and the frequency $f_M$ of a received pulse train, and also a stepped waveform of a frequency $f_L$ outputted from the sample and hold circuit 220.

As mentioned above, the waveform outputted from the sample and hold circuit 220 is repeated at a frequency $f_L$, and comprises n hold values. Therefore, the memory 400 is required to have a memory capacity to contain n values or more. The memory 400 is configured in such a manner that the address is incremented by the CPU 500 at each light emitting pulse, and AD-converted data is sequentially stored in the memory 400 via the CPU 500.

The memory 400 and the CPU 500 also have a function as an adding means, and therefore make it possible to add data stored at an arbitrary address in the memory 400 to AD-converted data, and then store the result in the memory 400 again. Data at and after a (n+1)th pulse represents the same phase relation as that in the first period.

Therefore, when the level determination circuit 200 determines that the light quantity of the pulse train of received light is at a proper value, the above data is added to the data in the previous period, and then the result is subjected to averaging processing, whereby the accuracy of AD-converted data can be improved.

Specifically, the output signal of the sample and hold circuit (S/H) 220 completes one period at a frequency of 30 Hz. The signal does not form a sine wave, but AD-converted data that substantially forms a sine wave can be produced by sorting the data at a stage where the data is stored in the memory 400 after AD conversion. In other words, when the period of the output signal is not 1/n of the period of a received signal, data that represents a similar signal to the received signal can be reproduced by sorting data at each address in the above-mentioned memory means.

Moreover, data obtained by sample and hold processing using a light emitting pulse train at and after a $102^{nd}$ pulse and by AD conversion represents data in and after a second period at 30 Hz. Therefore, when a result of determination by the level determination circuit 200 shows that the light quantity of the pulse train is at a proper value, the above data is added to data up to the previous period, and the resulting data is thereafter subjected to averaging processing, whereby the accuracy of AD-converted data can be improved.

Next, a method of calculating a phase from data stored in the memory 400 will be described. A horizontal line of the waveform of $f_L$ in FIG. 7(b) corresponds to an address of data stored in the memory 400, while a vertical line of the waveform of $f_L$ corresponds to a data value at the address.

Figure 8:
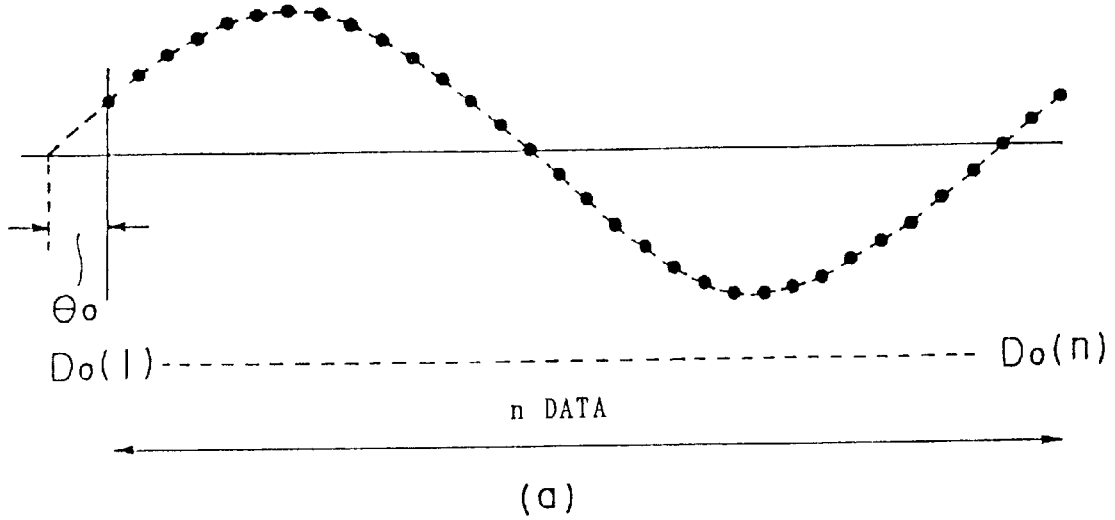
FIGS. 8(*a*) and 8(*b*) are diagrams of assistance in explaining the principles of a pulse-system light wave rangefinder.
Figure 8:
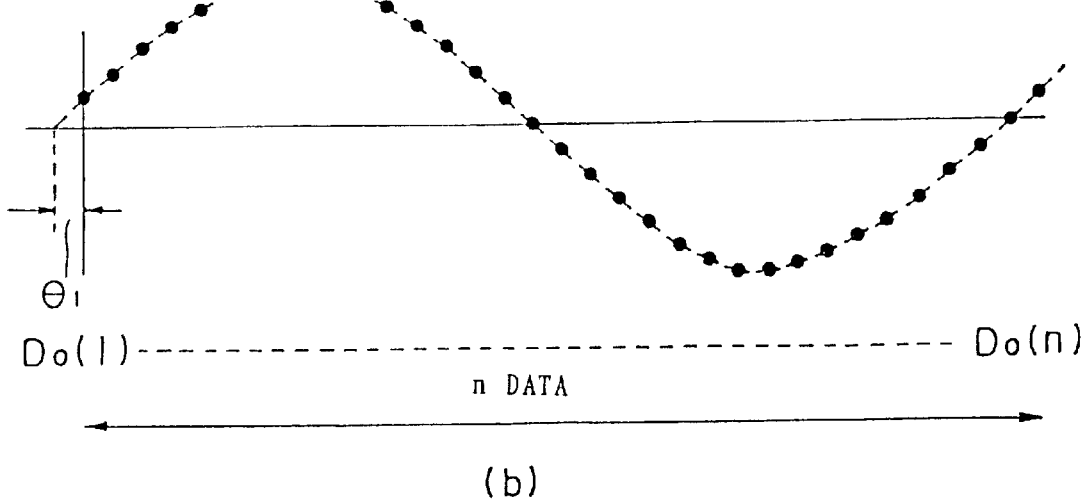
Figure 9:
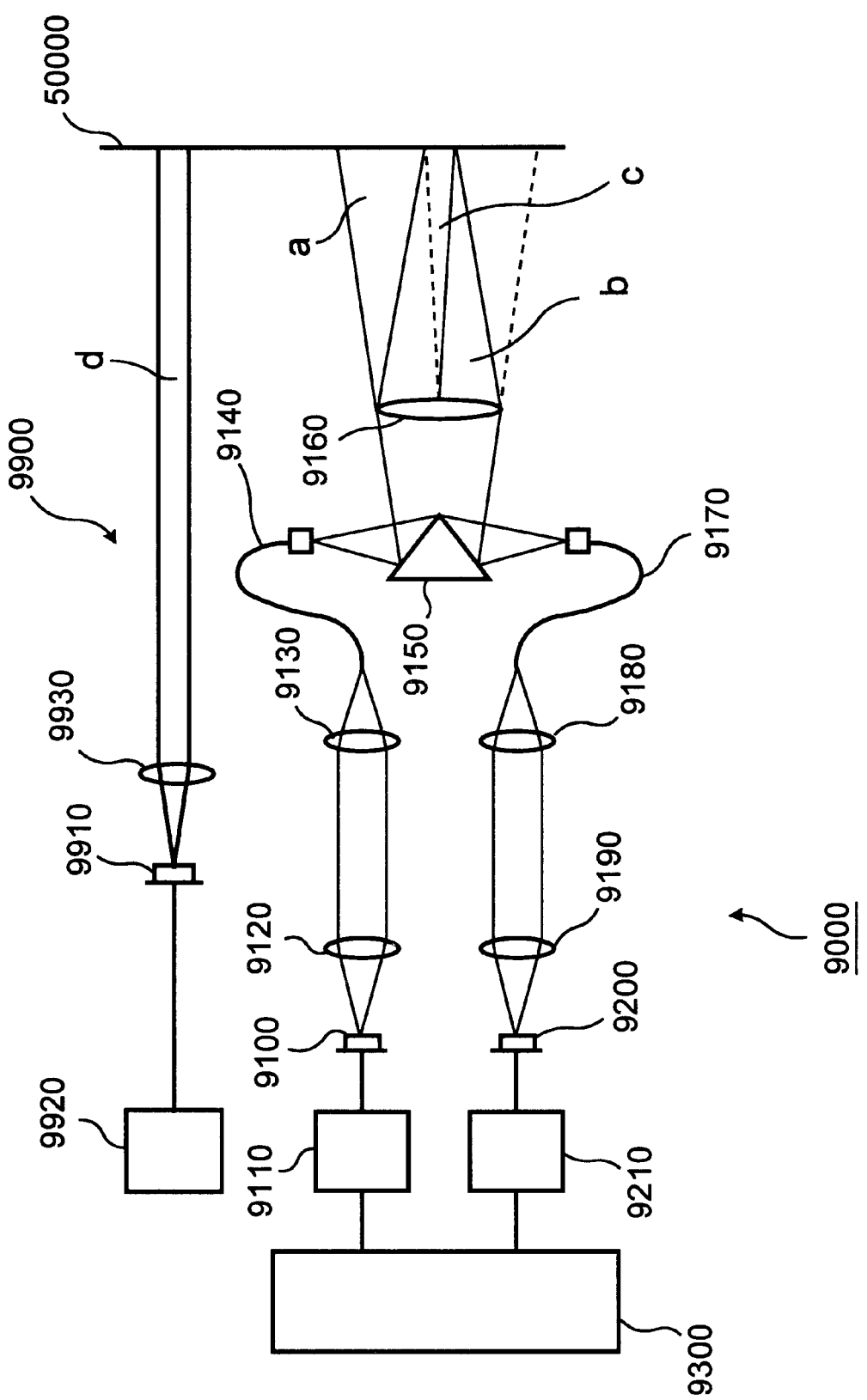
FIG. 9 is a diagram of assistance in explaining a conventional technique.

The waveform of $f_L$ in FIG. 7(b) is obtained from a sine wave from the band-pass filter 210. Also, the sequence of a phase shift of a pulse train having a frequency $f_M$ relative to the sine wave $f_S$ is already known. Therefore, the sine wave can be reconstructed by sorting addresses in the memory 400. The reconstructed sine wave is shown in FIGS. 8(a) and 8(b). When each piece of data of the sine wave form is set to be $D_0(i)$, the phase $\theta_0$ of the sine wave form is determined by using the following equations:

$$a = \sum_{i=1}^{n} D_o(i) \times \text{Sin}\left(2\pi \times \frac{i}{n}\right) \qquad \text{[Equation 9]}$$

$$b = \sum_{i=1}^{n} D_o(i) \times \text{Cos}\left(2\pi \times \frac{i}{n}\right) \qquad \text{[Equation 10]}$$

$$\theta_o = \tan^{-1}\left(\frac{b}{a}\right) \qquad \text{[Equation 11]}$$

(where i=1 to n).

This operation is equivalent to determining the phase of a fundamental wave component of a waveform $f_L$ from the waveform of frequency $f_L$ outputted from the sample and hold circuit 220 by a method of Fourier transformation.

The operation described above can be performed by the memory 400 and the CPU 500. Thus, the phase measuring apparatus 90000 comprises the AD converter 300, the memory 400, and the CPU 500.

The processing performed in a manner described above from light emission by the laser diode 1 to the storing of AD-converted data into the memory 400 is performed for the external distance-measuring optical path and the internal reference optical path. Then, a phase difference φ between two waveforms represented by AD-converted data for the internal reference optical path and AD-converted data for the external distance-measuring optical path corresponds to an optical path difference.

Specifically, when the phase of the external distance-measuring optical path is set to be $\phi_0$, and the phase of the internal reference optical path is set to be $\theta_1$ the distance from the light wave rangefinder to the corner cube, an object to be measured, is $$L = (\theta_0 - \theta_1) \times \frac{1}{2\pi} \times \frac{C}{f_S} \times \frac{1}{2} \qquad \text{[Equation 12]}$$

where C is the velocity of light.

An accurately measured distance L determined in this manner is obtained by enlarging the time axis of the reference frequency $f_S$ of the crystal oscillator 100 and then determining the phase by Fourier transformation. Thus, the distance is obtained by interpolating a distance having $(C/f_S)*(½)$ as one period. Therefore, when $f_S$ is set to be 15 MHz, one period represents 10 m.

Also, a roughly measured distance can be obtained with an accuracy of 10 m from a counter value of the counter 180 for the external distance-measuring optical path. Specifically, the counter 180 counts the reference frequency $f_S$ of the crystal oscillator 100 for a period of time between the receiving of a signal from the second frequency divider 130 and a signal from the waveform shaping circuit 170. Then, the count value is sent to the CPU 500, and thereby a roughly measured distance can be obtained from a difference between the count value for the external distance-measuring optical path and a count value for the internal reference optical path.

Then, by combining the roughly measured distance and the accurately measured distance, an actual distance from the light wave rangefinder to an object of measurement can be obtained. The configuration that performs these operations corresponds to a distance measuring means.

It should be noted that in the case of an accurately measured distance, the phase of a fundamental wave component is determined by subjecting AD-converted data values to Fourier transformation, and therefore a waveform to be sampled and held does not necessarily need to be a sine wave, and it may be an integral wave, a triangular wave, or the like. It should also be noted that a low-pass filter may be employed instead of the band-pass filter 210.

In addition, the present invention can be applied not only to a light wave rangefinder of the pulse system, but also to phase measurement by a light wave rangefinder of a conventional continuous modulation system using an LED.

According to the present invention comprised as described above, there are provided a measuring light emitting device which emits measuring light rays; a light transmitting optical system which directs the measuring light rays at an object of measurement; a light receiving optical system which receives the measuring light rays reflected from the object of measurement; a light receiving device which receives the reflected measuring light rays and forms a light receiving signal; a control arithmetic unit which calculates a distance to the object of measurement on the basis of the light receiving signal; and a pointer light emitting device which introduces visible light into the light transmitting optical system. Therefore, by bringing laser pointer light into a focused state while visually checking a measuring position, the three areas of light rays, that is, an area irradiated with the laser pointer light, an area irradiated with the measuring light rays, and an image at the entrance end of a light guide member on the light receiving side can be made to perfectly coincide with one another.

Even in measurement of an object of measurement at short range, it is much easier to exactly grasp a current measuring position with respect to the whole of an object to be measured. In addition, focusing operation is readily performed even in a dark environment. Furthermore, even when measurement is made inside a tunnel, it is much easier to measure an area around the vertex of the tunnel. Thus, the light wave rangefinder according to the present invention provides such superior effects.

What is claimed is:

1. A light wave rangefinder comprising:
    a measuring light emitting device for emitting measuring light;
    a light transmitting optical system for directing the measuring light at an object of measurement;
    a light receiving optical system for receiving reflected light reflected from the object of measurement;
    a light receiving device for receiving the reflected light and forming a light receiving signal;
    a control arithmetic unit for calculating a distance to the object of measurement on the basis of the light receiving signal;
    a pointer light emitting device for introducing visible laser pointer light into said light transmitting optical system whereby the pointer light is transmitted coaxially with the measuring light;
    a pointer image focusing mechanism for focusing said measuring light; and
    a timing control system whereby the transmission of the pointer light is temporally separated from the transmission of the measuring light.

2. A light wave rangefinder comprising:
    a measuring light emitting device for emitting measuring light;
    a light transmitting optical system for directing the measuring light at an object of measurement;
    a light receiving optical system for receiving reflected light reflected from the object of measurement, whereby the pointer light is transmitted coaxially with the received reflected light;
    a light receiving device for receiving the reflected light and forming a light receiving signal;
    a control arithmetic unit for calculating a distance to the object of measurement on the basis of the light receiving signal;
    a pointer light emitting device for introducing visible laser pointer light into said light transmitting optical system for said light transmitting optical system;
    a pointer image focusing mechanism for focusing said measuring light; and
    a timing control system whereby the transmission of the pointer light is temporally separated from the transmission of the measuring light.

3. A light wave rangefinder as claimed in claim 2, wherein a light guide member on a light emitting side for guiding the measuring light rays is formed in the light transmitting optical system, so that visible light from the pointer light emitting device is introduced into an entrance end of the light guide member on the light emitting side.

4. A light wave rangefinder as claimed in claim 3, further comprising an object lens having an object lens aperture portion, and wherein the light guide member has a light guide aperture at its output end, whereby the laser pointer light being transmitted through the object lens aperture has an aperture form different from a form of the laser pointer light at an output end of the light guide member on its light emitting side.

5. The light wave rangefinder according to claim 1 further comprising a collimating optical system for collimating the measuring point of said measuring object.

6. The light wave rangefinder according to claim 1 further comprising a polarizing device in communication with the pointer light emitter for polarizing the pointer light.

7. The light wave rangefinder according to claim 2 further comprising a collimating optical system for collimating the measuring point of said measuring object.

8. The light wave rangefinder according to claim 2 further comprising a polarizing device in communication with the pointer light emitter for polarizing the pointer light.

* * * * *